Dec. 14, 1943.  O. THOMPSON, SR  2,336,901
CUTTING IMPLEMENT
Filed Oct. 6, 1943
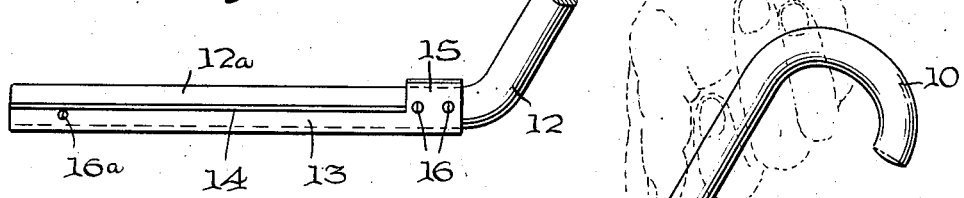
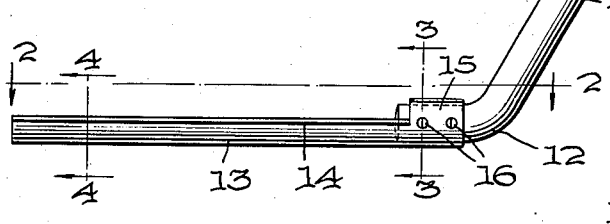
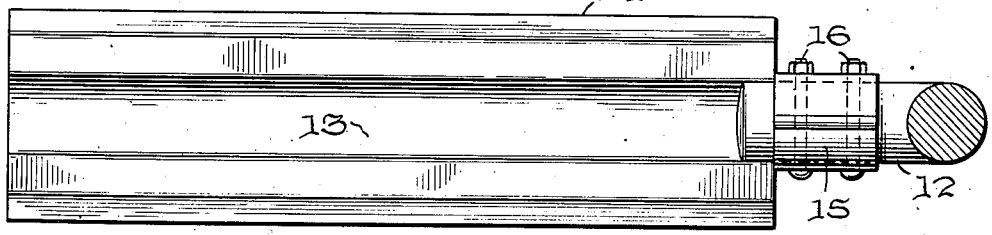
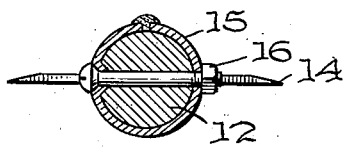
Inventor
OVERTON THOMPSON, SR.,
By Church & Church
HIS Attorneys Patented Dec. 14, 1943

2,336,901

UNITED STATES PATENT OFFICE 2,336,901

CUTTING IMPLEMENT

Overton Thompson, Sr., Nashville, Tenn.

Application October 6, 1943, Serial No. 505,222

3 Claims. (Cl. 30—318)

This invention relates to improvements in cutting implements of the so-called swing-stroke type, used primarily for cutting grass or weeds and other forms of vegetation.

The primary object of the invention is to provide an implement of this type which may be produced at small cost and which, though of simple construction, is, nevertheless, sturdy and capable of being used without any great danger of being injured by small stones or other obstacles on the ground or by its cutting edges contacting the surface of the ground.

Another object is to provide an elongated blade which will possess the desired rigidity and which can be firmly attached to a handle by simple fastening means, the handle and blade being so associated that the handle tends to reinforce the blade and prevents localization of strains at the point of connection of the blade and handle.

More particularly, the invention contemplates an implement having an elongated, one-piece blade formed with flat cutting edge portions and a longitudinal groove located between said flat portions, with said groove merging into a ring-like socket at one end of said cutting portions. The handle is preferably formed with an offset end portion which extends through the socket into said groove a distance sufficient to distribute over a comparatively large area the strains which would otherwise be located at the point where the handle is secured in the socket by fastening elements, such as bolts. The groove, which is in the upper surface of the blade, forms a rib below the cutting edges, which prevents those edges coming into contact with the ground, and, as the groove is of semicircular cross-section and the surface of the rib is smooth, if the operator should strike the ground, the blow will be a glancing one. The securing elements are also disposed in a plane substantially parallel to the flat cutting portions, so that they do not project beyond the lowermost portion of the rib surface. Thus, these elements cannot tear or injure the turf when a lawn is being cut.

With these and other objects in view, the invention consists in certain details of construction and combinations and arrangements of parts, all as will hereinafter be more fully described and the novel features thereof particularly pointed out in the appended claims.

In the accompanying drawing,

Figure 1 is a side elevation of an implement embodying the present improvements, a portion of the handle being broken away;

Fig. 2 is a sectional view on the line 2—2 of Fig. 1;

Fig. 3 is a sectional view on the line 3—3 of Fig. 1;

Fig. 4 is a sectional view on the line 4—4 of Fig. 1; and

Fig. 5 is a side elevation of the head portion of the implement, illustrating a modification of the invention.

As illustrated in Fig. 1, the handle has an offset, curved upper end or handle portion 10, an intermediate portion 11, and a lower, offset end portion 12 to which the cutting blade is attached. This blade is preferably of the double-edge type, having a longitudinal, centrally located groove 13 with flat cutting edge portions 14 at opposite sides thereof. In the swing-stroke type of cutters, the blade is usually of considerable length and would normally be quite flexible, but, in the present instance, this flexibility is minimized by the groove 13 which incidentally also serves other purposes which will presently appear. The flat, cutting portions 14 of the blade member terminate short of the end of said member to which the handle is attached, and the metal beyond these edge portions is turned inwardly from opposite sides to form, in conjunction with the groove 13, a ring-like socket 15 for the offset end 12 of the handle. Preferably, the handle and the socket are circular in cross-section and the groove semicircular, but other shapes may be used. In securing the handle in socket 15, the securing elements 16, preferably bolts, with nuts, extend through handle section 12 and the socket 15 transversely to and in a plane substantially parallel to the flat portions 14 of the blade, so that no portion of these elements projects below the lowermost surface of the rib, which is formed on the under surface of the blade by the depression which constitutes groove 13. In this way, all danger of the fastening elements tearing or injuring the turf is eliminated and the rib presents a smooth surface, whereby, if the operator should swing the blade too low and strike the ground with the rib, the blow will be a glancing one and will not injure the blade or impose any undue strain on the connection between the handle and blade.

In order to further minimize the strains imposed on the fastening elements or to prevent such strains being localized at the point where the fastening elements extend through the handle and socket, the end portion 12 of said handle is made of a length sufficient to extend not only through the tubular socket, but also at least part way into the groove 13. Thus, any strains that would normally be transmitted to the connection formed by the fastening elements 16 will be distributed over a comparatively large area of the contacting surfaces of the blade and handle. This greatly retards the development of a loosened condition at the point of connection.

From the foregoing it will be apparent that the one-piece grooved blade member is not only of simple, inexpensive construction, but it also possesses several distinct advantages in connection with the somewhat extended end portion 12 of the handle to which it is attached. For instance, the blade may be made rather light in weight and still possess minimum flexibility by reason of the groove 13, and the rib, formed by the groove, tends to minimize strains imposed on the connection between handle and blade by reason of its transverse curvature. Also, the groove permits the handle portion 12 to extend beyond the socket 15 and overlap the blade proper to prevent localization of strains at the immediate point of connection.

In the modified form of the invention illustrated in Fig. 5, the offset portion 12 of the handle is extended substantially the full length of groove 13, as indicated at 12ª, and additional fastening elements, such as another bolt 16ª, is provided near the outer end of the head or handle. This bolt 16ª preferably lies parallel to the bolts 16 used at the socket end of the head. This extension 12ª of the offset portion of the handle may be used where it is desired to increase the rigidity of the blade or afford additional reinforcement for the blade, especially when the blade is made of relatively thin stock. The extension 12ª may also function to increase the weight of the head and to give the implement, as a whole, the desired balance where relatively light stock is used for the blade.

What I claim is:

1. A cutting implement of the swing-stroke type comprising a handle having an offset end portion, a blade having a cutting edge with a depression extending longitudinally of said edge, said depression constituting a socket for the offset end of the handle in the upper surface of the blade and a deflecting rib on the under surface of the blade, and fastening elements extending through said handle and said rib transversely of and in a plane parallel to said cutting edge.

2. In a cutting implement of the swing-stroke type comprising a blade having a longitudinal groove in the upper surface thereof with flat cutting edge portions at opposite sides of said groove, said blade having an integrally formed socket beyond one end of said cutting edges, said socket forming a continuation of said groove, a handle having an offset end portion extending through said socket into said groove, and fastening elements extending through the handle and the walls of said socket, said elements being disposed transversely of and substantially parallel to the flat portions of said blade, said groove constituting a deflecting rib on the under surface of said blade.

3. In a cutting tool of the swing-stroke type, a blade member having a semicircular depression extending longitudinally thereof with flat cutting edge portions at opposite sides of said groove, said flat portions terminating short of one end of said member with the end of said member beyond said flat portions bent to form a circular socket in conjunction with said groove, a handle having an offset end portion extending through said socket into said groove, and fastening elements extending through said handle and socket transversely of and in a plane substantially parallel to the flat cutting edge portions of the blade member.

OVERTON THOMPSON, Sr.